Oct. 25, 1960 J. V. BATLEY 2,958,072

DECODER MATRIX CHECKING CIRCUIT

Filed Feb. 11, 1958 2 Sheets-Sheet 1

INVENTOR.
JAMES V. BATLEY

BY George Baron

ATTORNEY

| | LEFT IN | RIGHT IN | ANSWER |
|---|---|---|---|
| TYPE #1 FAILURE | 1 | 1 | 0 |
| | 0 | 0 | 0 |
| | 1 | 0 | 0 |
| | 0 | 1 | 0 |
| TYPE #2 FAILURE | 0 | 0 | 1 |
| | 1 | 0 | 1 |
| | 0 | 1 | 1 |
| | 1 | 1 | 1 |
| TYPE #3 FAILURE | 0 | 0 | 0 |
| | 1 | 0 | 1 |
| | 0 | 1 | 0 |
| | 1 | 1 | 1 |
| CORRECT OPERATION | 0 | 0 | 0 |
| | 0 | 1 | 0 |
| | 1 | 0 | 0 |
| | 1 | 1 | 1 |

United States Patent Office 2,958,072
Patented Oct. 25, 1960

2,958,072

DECODER MATRIX CHECKING CIRCUIT

James V. Batley, Kingston, N.Y., assignor to International Business Machines Corporation, New York, N.Y., a corporation of New York Filed Feb. 11, 1958, Ser. No. 714,606

7 Claims. (Cl. 340—147)

This invention relates to data handling circuits, and more particularly to a circuit for checking the proper operation of a decoding matrix.

In many computers, a decoding matrix is employed to convert an input signal, represented by a plurality of binary digits, into a single signal pulse or D.C. level. The plural binary digit input signal may be an "instruction" to the computer in the encoded form, and the decoding matrix will convert such plural binary digit into a single pulse, usually, though not necessarily, a D.C. level, such D.C. level indicating the "instruction" to be carried out by some portion of the computer. For example, the instruction to perform "addition" might be represented by the binary number 1000, the instruction to perform the step of "multiplication" might be represented by the binary number 1100, "subtraction" by the binary number 1010, etc. A register that stores the instruction should be big enough to contain the longest possible instruction. If the binary instruction number contains four digits, there will be sixteen possible output lines in the decoding matrix circuit. In general, if the instruction number contains $n$ digits, there will be $2^n$ output lines in the output circuit of the decoding matrix wherein the proper functioning of the decoder will result in one and only one output line being actuated for every unique instruction appearing in binary form.

A decoding matrix circuit will usually comprise a plurality of AND circuits for effecting the transition from the plurality binary bits representation of an instruction to a selected unique line in the output circuit of such decoding matrix. The present invention provides a checking circuit for insuring the detection of translating errors, namely, those errors that result in a false output.

The principle of the present decoding matrix checking circuits is derived by envisioning the results of failures in the AND circuits that are employed in the decoder matrix. Regardless of the internal design of an AND circuit, there are only three ways in which such circuits can fail, namely, (case I) no output is produced by the AND circuit even in the presence of two inputs to it; (case II) an output is always produced by the AND circuit even when there are no inputs to it; and (case III) the AND circuit produces an output signal when only one input is applied to the AND circuit. In examining the results of each of the above failures, the following rules are obtained:

*Case I.*—If an AND circuit produces no output, no error will result in the decoder matrix output circuit until the latter is required to decode an instruction whose proper decoding requires an output from the failed circuit. In this situation, there will be no output from the decoder matrix.

*Case II.*—If an AND circuit produces an output signal where there are no inputs to it, no error in the decoder matrix will occur until the output of the AND circuit is not required to decode the instruction in the register. In this situation, there will be two output lines selected or appearing in the output circuit of the decoder matrix, one correct and one incorrect.

*Case III.*—If an AND circuit produces an output signal with only one input signal, no error will occur in the decoder matrix output circuit until such AND circuit receives a single input. In that situation, there will be two outputs from the matrix, one correct and one incorrect.

Thus we arrive at a principle that sooner or later a single failure in a decoding matrix will result in either no outputs or two outputs from the decoder matrix, but will not produce a single incorrect output. The above principle is employed in the construction of a checking circuit for a decoder matrix. In a decoder matrix employing four flip-flops to store the encoded instruction in binary form, eight AND circuits are employed, each to produce an output signal for a unique pair of flip-flop state. Since two flip-flops can have four possible pairs of states, for example, 00, 01, 10, and 11, four AND circuits are coupled to each pair of flip-flops.

The output signals of the eight AND circuits are fed into sixteen AND circuits, and the sixteen individual outputs of such sixteen AND circuits are the encoded instructions in decoded form. The outputs of the sixteen AND circuits, besides being sent to other parts of a computer to perform the selected instruction, are also fed into four distinct OR circuits. That is, four AND outputs are fed into one OR circuit in such a manner that the four AND circuits associated with a given OR circuit have no common input. Such use of AND circuits with OR circuits, as will be explained hereinafter, will permit the detection of any AND circuit that may fail to operate properly, such failure resulting in improper operation of the decoder matrix. Such failure will be detected almost immediately by employing two "exclusive-OR" circuits such that the outputs of the four OR circuits are fed into the two "exclusive-OR" circuits, the latter two "exclusive-OR" circuits being arranged in a "tree" fashion with a third "exclusive-OR" circuit. The presence of a single output from such third "exclusive-OR" circuit will indicate the proper functioning of the decoder circuit. Furthermore, by keeping the decoded outputs of encoded instructions of odd and even parity separate until the last stage of the present novel checking circuit, and by employing two AND circuits and a single OR circuit in conjunction with the aforesaid "tree" of "exclusive-OR" circuits in a manner hereinafter to be shown and described, the output from the matrix checking circuit can be made to monitor the parity of the information in the flip-flops feeding into the decoding matrix, and to compare this parity with a parity bit associated with the encoded instruction for checking purposes. In this manner, both the input and the output of the decoding matrix are checked.

It is an object of this invention to provide a checking circuit for a decoding matrix.

It is yet another object to provide a decoder matrix checking circuit that will provide almost instantaneous detection of errors produced in the decoding circuit.

A further object is to provide a checking circuit for detecting all single failures in a decoding matrix.

Still another object is to provide a parity check in conjunction with the decoder matrix check so that both the input and output of a decoder matrix are simultaneously checked.

Other objects of the invention will be pointed out in the following description and claims and illustrated in the accompanying drawings which disclose, by way of example, the principles of the invention and the best modes which have been contemplated of applying those principles.

Figure 1:
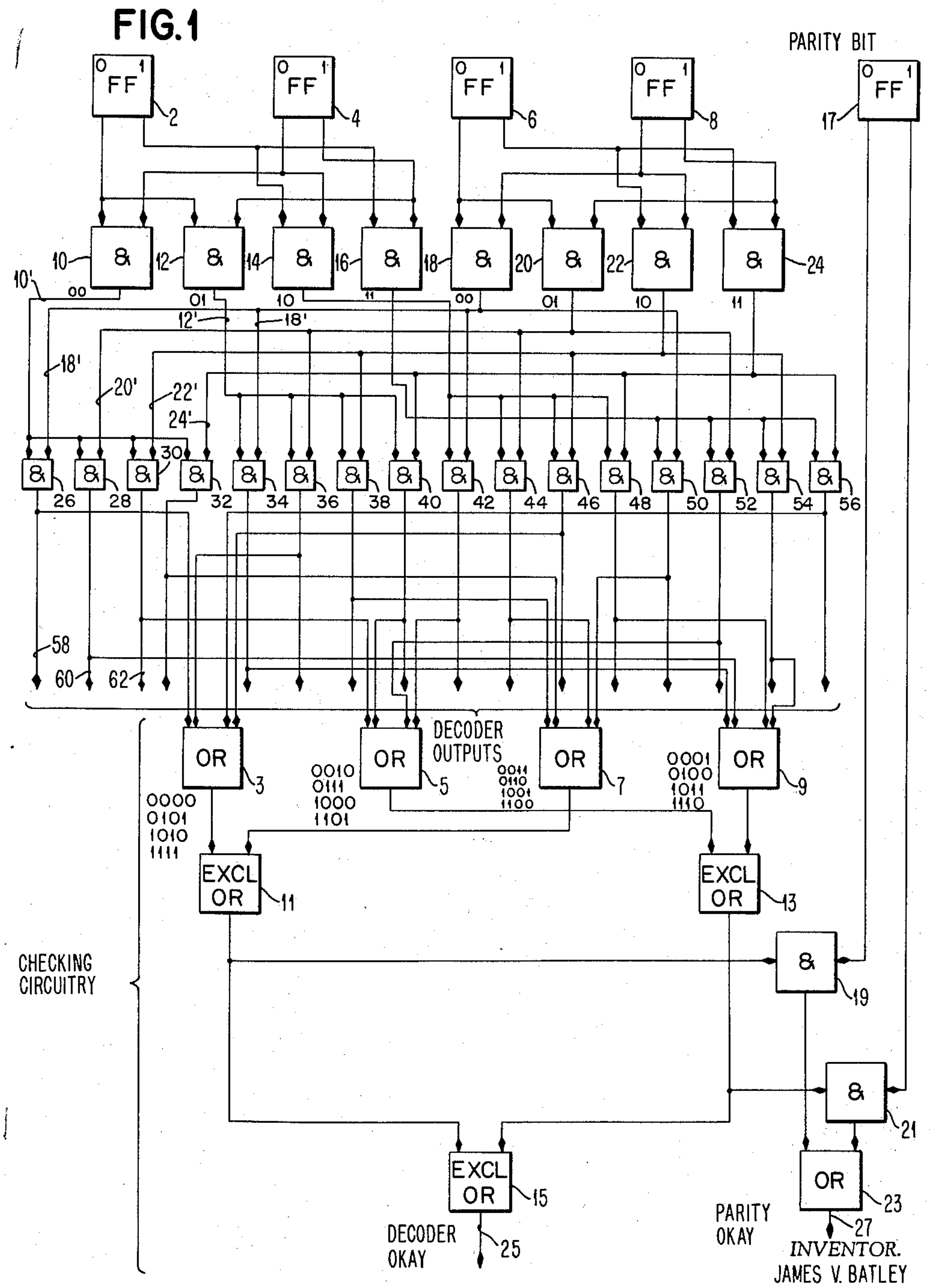
Fig. 1 is a schematic representation, in block form, of the checking circuit that forms the present invention.

Referring to Fig. 1 there are shown four flip-flops 2, 4, 6 and 8 which store the instruction in encoded form, such instruction to be decoded by the decoding matrix so as to produce a single D.C. signal level at a unique output line of such decoder. When a flip-flop such as 2, 4, 6 or 8 is set in its "0" state, then the "0" side of the output terminal of said flip-flop is "up" and producing a D.C. signal, and when it is in its "1" state, the "1" side of the flip-flop's output terminal is "up" and producing a D.C. signal. The D.C. output levels are fed into AND circuits 10, 12, . . . 24, such D.C. levels conditioning the respective AND circuits into which they feed. It is noted that AND circuits 10—16 yield as outputs the four possible combination of conditions of flip-flops 2 and 4, namely 00, 01, 10, and 11, whereas AND circuits 18—24 yield similar outputs or flip-flops 6 and 8. The output signals from AND circuits 10—24 are fed along output circuits, represented by lines such as 18′, 20′, 22′, 24′, etc. to another group of AND circuits 26, 28, 30, . . . 56. The individual outputs of these last AND circuits 26, 28, . . . 56 form the decoder matrix outputs which are transmitted along lines such as 58, 60, 62, etc. to other parts of a computer, each decoder matrix output being an "instruction" in decoded form of an "instruction" read in the encoded form into the register comprised of flip-flops 2, 4, 6 and 8. Each decoder matrix output is also fed into one of four OR circuits 3, 5, 7 and 9 that form part of the checking circuit for the decoder matrix. It will also be observed by study of Fig. 1 that the four AND circuits from the group that includes AND circuits 26, 28, 30, . . . 56 which feed into any one of the OR circuits 3, 5, 7 and 9 have no common input. Two OR circuits 3 and 7 have their output signals fed to an "exclusive-OR" circuit 11 whereas the two OR circuits 5 and 9 are fed "exclusive-OR" circuit 13. The output signals from such "exclusive-OR" circuits 11 and 13 are fed into a third "exclusive-OR" circuit 15.

A parity bit is sent along with the binary number which is placed in encoded form in the instruction register comprising flip-flops 2, 4, 6 and 8. In an even parity system, parity bit flip-flop 17 will be in its "1" state if the number of "1's" in such instruction register is odd, but will be in its "0" state if the number of "1's" in the instruction register is even. AND circuits 19, 21, and OR circuit 23 are associated with the decoder matrix checking circuit in a manner, to be explained hereinafter, that will enable one to check the parity count of the instruction word as well as the output of the decoder matrix.

Figure 2:
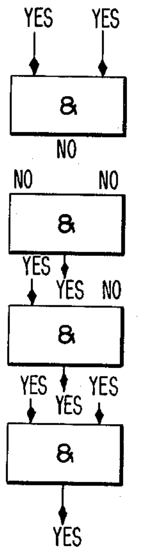
Fig. 2 is a truth table of the type of failures that might occur in an AND circuit.

Turning to Fig. 2 there is shown a truth table for the type of failures that may befall an AND circuit. In a Type 1 failure of an AND circuit, the presence of two simultaneous inputs will not produce an output. Consequently, such type of failure means that the particular AND circuit involved is never operating to produce an output signal. In a Type 2 failure, the AND circuit involved is always producing an output signal regardless of the presence or absence of input signals to it. In a Type 3 failure, the presence of an input signal at a first input terminal of an AND circuit, regardless of the presence or absence of an input signal at the second input terminal, will produce an output signal. The three types of AND failures indicate that a single failure in a decoding matrix will result in either no output or two outputs among output circuits such as 58, 60, 62, etc., but will not produce a single incorrect output.

As can be seen in Fig. 1, a single output signal appearing at the output terminal 25 of the "exclusive-OR" circuit 15 indicates that the decoder matrix is operating properly. This is so because a single output signal appearing at output terminal 25 indicates that only one of the two "exclusive-OR" circuits 11 and 13 is operating. Since both "exclusive-OR" circuits 11 and 13 have two OR circuits feeding into each of them, the latter can only produce an output signal to "exclusive-OR" circuit 15 when only one (or three, which can be neglected) of the four OR circuits is producing an output signal. Since an OR circuit has no common input, the presence of a single output signal at the output terminal 25 is a check that the decoder is working properly against single error failures.

In a similar manner it can be seen that if two separate OR circuits of the four shown, namely 3, 5, 7 and 9, are producing outputs, then both "exclusive-OR" circuits 11 and 13 are producing output signals to "exclusive-OR" circuit 15, or neither "exclusive-OR" circuit 13 or 15 is producing an output signal to "exclusive-OR" circuit 15. In both latter instances, "exclusive-OR" 15 will be disabled so as to fail to produce an output signal along output terminal 25.

It is noted that the above examples are given for two decoder outputs that are fed into different ones of the four OR circuits 3, 5, 7 and 9. Where two decoder outputs are fed into the same OR circuit of the checking circuit, the latter will not be able to detect the error. But since the four AND circuits feeding into any one of the OR circuits 3, 5, 7 and 9 have no common input, only a Type 2 failure in these AND circuits can lead to two output signals from their associated OR circuit. The Type 2 failure, however, will be detected as soon as one of the twelve instructions, namely 0000, 0101, 1010, etc., which does not feed into the OR circuit associated with the failed AND circuit is decoded. Thus the checking circuit will detect most single error failures immediately and will detect others one or two instructions later.

The checking circuit described thus far monitors the outputs of the decoder. The same checking circuit is combined with parity flip-flop 17, two AND circuits 19 and 21, and OR circuit 23 to obtain a check of the input. For example, assume that we are in an even parity. When the number of "1's" in the instruction register comprising flip-flops 2, 4, 6 and 8 is odd, then parity flip-flop 17 is in the "1" state so as to make the parity even. When such instruction conatins an even number of "1's," then flip-flop 17 is in the "0" state. It is noted that the output of "exclusive-OR" circuit 11 is one of the inputs to AND circuit 19 and the "0" output of flip-flop 17 is the other input to AND circuit 19. In a similar manner, the output of "exclusive-OR" circuit 13 is one of the inputs to AND circuit 21 and the "1" side output of flip-flop 17 is the other input to AND circuit 21.

The operation of the parity checking circuit is readily seen. OR circuits 3 and 7 are actuated by only those instructions that have an even parity instruction word. Consequently "exclusive-OR" circuit 11 will condition AND circuit 19 when the parity of the instruction is even. If parity flip-flop 17 is also conditioning AND circuit 19, that means that flip-flop 17 is in the "0" state, and an output signal will appear at terminal 27 through OR circuit 23. In a similar manner "exclusive-OR" circuit 13 is actuated by instructions whose words are odd parities and the output of such "exclusive-OR" circuit is used to condition AND circuit 21, the later producing an output signal to OR circuit 23 when parity flip-flop 17 is in the "1" state. Consequently outputs appearing at terminal 27 indicate that the instruction has been correctly entered into flip-flops 2, 4, 6 and 8.

Figure 3:
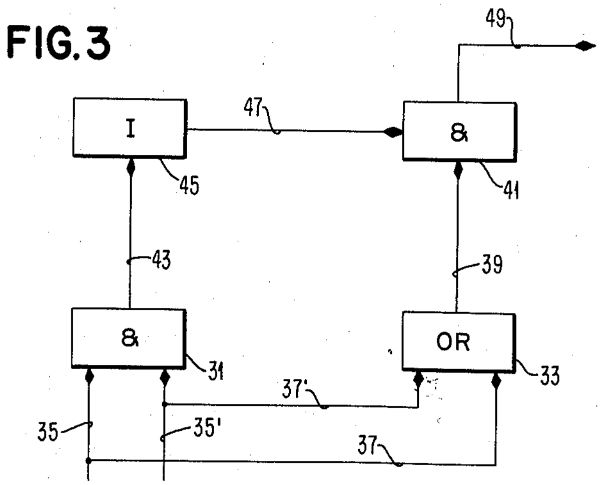
Fig. 3 is a schematic representation, in block form, of an "exclusive-OR" circuit employed in the checking circuit of Fig. 1.

Fig. 3 shows, only by way of example, an "exclusive-OR" circuit that is used in the present invention. An AND circuit 31 and an OR circuit 33 simultaneously receive the same input signals, one signal being fed into the AND circuit 31 along input lead 35 and into the OR circuit 33 along input lead 37, and the other signal entering AND circuit 31 along input lead 35′ and OR circuit 33 along input lead 37′. The output of the OR circuit 33 is fed along output 39 to a second AND circuit 41, whereas the output of AND circuit 31 is fed via output lead 43 to an inverter 45, such inverter 54 producing the AND-NOT function. That is, when there is no input signal along line 43 to the inverter 45, there is an output signal along lead 47, whereas when there is an input signal on lead 43, there is no output signal along output lead 47.

Using D.C. levels for input and output signals, it can be seen that the presence of two input D.C. levels on leads 35 and 35′ will cause AND circuit 41 to be conditioned by an output signal from OR circuit 33, but the presence of a signal on input lead 52 will trigger the inverter 45 so that the latter is "down" and no signal appears on lead 47. Thus two input D.C. levels along leads 35 and 35′ will prevent AND circuit 41 from yielding an output along lead 49. However, if only one signal or D.C. level is present (either at input lead 35 or 35′), AND circuit 41 will be conditioned by an input signal appearing on lead 39, but since no input signal now appears on lead 43, the inverter 45 is operative to produce a signal or D.C. level along lead 47 to condition AND circuit 41. The presence of two D.C. levels as inputs to AND circuit 41 produces an output signal along lead 58. The "exclusive-OR" function is obtained because the presence of one, and only one, input at the input terminals of AND circuit 31 will permit an output signal to appear at the output lead 49.

Where the term "instruction" is used herein, it is to be understood that the invention can be applied to the checking of any decoder circuit that yields a single output for any configuration of input signals.

Although the schematic block diagrams shown herein may employ bistable cores, transistors, or tubes, the AND circuits, OR circuits and flip-flops employed herein are of the type shown in a copending application entitled "Electronic Digital Computer" By Bernard L. Sarahan et al., Serial No. 414,459, which was filed on March 15, 1954. The inverter used in conjunction with the AND and OR circuits of the above identified copending application in order to obtain the "exclusive-OR" function is shown and described in a copending application entitled "Magnetic Data Storage" by Robert R. Everett et al., Serial No. 494,982 and filed on March 17, 1955.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A decoding matrix checking circuit comprising a register of $n$ bistable state devices for storing an encoded word in binary form, a first group of $2^n$ AND circuits connected to said register for decoding said register into two groups of $$\frac{n}{2}$$

binary words, a second group of $2^n$ AND circuits connected to said first group of AND circuits so as to produce a unique output signal for each unique word stored in said register, $$2^{\frac{n}{2}}$$

OR circuits associated with said $2^n$ AND circuits and adapted to receive as inputs thereto the unique output signals produced by said $2^n$ AND circuits, said individual AND circuits of the second group being grouped to separate of said OR circuits so that such AND circuits feeding into a given OR circuit have no common inputs thereto, means for coupling the outputs of half the number of said OR circuits to a first "exclusive-OR" circuit, means for connecting the remaining half the number of said OR circuits to a second "exclusive-OR" circuit, and means for coupling the output signals of said first and second "exclusive-OR" circuits to a third "exclusive-OR" circuit.

2. A decoding matrix checking circuit as defined in claim 1 wherein half the number of said OR circuits produce outputs representative of binary words having an odd parity and the remaining half the number of said OR circuits produce outputs representative of binary words having an even parity.

3. A decoding matrix checking circuit comprising a register of four bistable state devices for storing an encoded word in binary form, a first group of eight AND circuits connected to said register, sixteen AND circuits connected to said first group of AND circuits for decoding said binary word so as to produce a unique output signal for each unique binary word stored in said register, four OR circuits connected to said sixteen AND circuits and adapted to receive as inputs thereto the unique output signals being produced by said sixteen AND circuits, said latter AND circuits being grouped to separate of said OR circuits so that the AND circuits feeding into a given OR circuit have no common inputs thereto, means for coupling the output signals of two of said four OR circuits to a first "exclusive-OR" circuit, means for coupling the output signals of the remaining two OR circuits to a second "exclusive-OR" circuit, and means for coupling the output signals of said first and second "exclusive-OR" circuits to a third "exclusive-OR" circuit.

4. A decoding matrix checking circuit as defined in claim 1 including a bistable device for generating a first signal pulse in accordance with the odd parity of the "1's" in said binary word in said register and for generating a second signal pulse in accordance with the even parity of "1's" in said binary word, a first AND circuit adapted to receive as input signals thereto said first generated signal pulse and an output signal from said first "exclusive-OR" circuit, a second AND circuit adapted to receive as input signals thereto the second generated signal pulse and an output signal from said second "exclusive-OR" circuit, and means for "oring" the output signals of said first and second AND circuits.

5. A decoding matrix as defined in claim 1 wherein $n$ is an odd number, the number of OR circuits is equal to $$2^{\frac{n+1}{2}}$$

6. A decoder matrix checking circuit comprising a register of $n$ bistable devices for storing an encoded word in binary form wherein $n$ is an even number, $2^n$ AND circuits coupled to said register so that each AND circuit produces a unique output for each binary word in said register, each AND circuit having only two inputs thereto, $$2^{\frac{n}{2}}$$

OR circuits connected to said $2^n$ AND circuits whereby the outputs of said AND circuits feed into a given OR circuit, said AND circuits being grouped so that the outputs of $$2^{\frac{n}{2}}$$

AND circuits feed into a single OR circuit and each AND circuit in each grouping has no common input whereby $$\frac{2^{\frac{n}{2}}}{2}$$

of said OR circuits transmit signals representative of even parity binary words and the remaining $$\frac{2^{\frac{n}{2}}}{2}$$

OR circuits transmit signals representative of odd parity binary words, means for connecting the odd parity output signals of said OR circuits to a first "exclusive-OR" circuit, means for connecting the even parity output signals of OR circuits to a second "exclusive-OR" circuit, and means for connecting the output signals of said first and second "exclusive-OR" circuits to a third "exclusive-OR" circuit.

7. A decoding matrix checking circuit as defined in claim 6 including a bistable device for generating a first signal pulse in accordance with the odd parity of the "1's" in the binary word in said register and for generating a second signal pulse in accordance with the even parity of the "1's" in said binary word, a first AND circuit adapted to receive as input signals thereto said first generated signal pulse and the output signal from said first "exclusive-OR" circuit, and a second AND circuit adapted to receive as input signals thereto the second generated signal pulse and an output signal from said second "exclusive-OR" circuit.

References Cited in the file of this patent

UNITED STATES PATENTS

| | | |
|---|---|---|
| 2,484,226 | Holden | Oct. 11, 1949 |
| 2,674,727 | Spielberg | Apr. 6, 1954 |
| 2,700,756 | Estrems | Jan. 25, 1955 |
| 2,719,959 | Hobbs | Oct. 4, 1955 |
| 2,769,971 | Bashe | Nov. 6, 1956 |

FOREIGN PATENTS

| | | |
|---|---|---|
| 697,744 | Great Britain | Sept. 30, 1953 |